United States Patent
Kreig et al.

(10) Patent No.: US 11,110,514 B2
(45) Date of Patent: Sep. 7, 2021

(54) APPARATUS AND METHODS FOR CONNECTING NODES TO TUBES IN TRANSPORT STRUCTURES

(71) Applicant: DIVERGENT TECHNOLOGIES, INC., Los Angeles, CA (US)

(72) Inventors: William David Kreig, Huntington Beach, CA (US); David Brian TenHouten, Los Angeles, CA (US); Chukwubuikem Marcel Okoli, Los Angeles, CA (US); Kevin Robert Czinger, Santa Monica, CA (US); Broc William TenHouten, Rancho Palos Verdes, CA (US); Antonio Bernerd Martinez, El Segundo, CA (US); Narender Shankar Lakshman, Torrance, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 873 days.

(21) Appl. No.: 15/841,857

(22) Filed: Dec. 14, 2017

(65) Prior Publication Data

US 2019/0184465 A1 Jun. 20, 2019

(51) Int. Cl.
*B22F 5/10* (2006.01)
*F16B 11/00* (2006.01)
(Continued)

(52) U.S. Cl.
CPC .............. *B22F 5/106* (2013.01); *B22F 10/20* (2021.01); *B33Y 10/00* (2014.12); *B33Y 80/00* (2014.12);
(Continued)

(58) Field of Classification Search
CPC ...... F16B 11/006; F16B 11/008; B22F 5/106; B22F 3/1055; B33Y 10/00; B33Y 80/00; B29L 2031/265
See application file for complete search history.

(56) References Cited

U.S. PATENT DOCUMENTS

| 4,648,616 A | * | 3/1987 | Diekman | F16B 11/008 |
| | | | | 280/281.1 |
| 4,804,209 A | * | 2/1989 | Fischer | F16L 13/11 |
| | | | | 285/296.1 |

(Continued)

FOREIGN PATENT DOCUMENTS

| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)
(Continued)

*Primary Examiner* — Matthew R McMahon
(74) *Attorney, Agent, or Firm* — Arent Fox LLP (57) ABSTRACT

Apparatus and methods for joining nodes to tubes with node to tube joints are presented herein. Joining techniques allow the connection of additively manufactured nodes to tubes. In an embodiment, at least one node may be joined to a tube and may be a part of a vehicle chassis. The node to tube joint connection incorporates adhesive bonding between the node to tube to realize the connection. Sealants may be used to provide sealed regions for adhesive injection, which are housed in sealing interfaces co-printed with the additively manufactured nodes. Additionally, seals may act as isolators and reduce galvanic corrosion.

24 Claims, 10 Drawing Sheets

(51) Int. Cl.
*B22F 10/20* (2021.01)
*B33Y 10/00* (2015.01)
*B33Y 80/00* (2015.01)
*B29L 31/26* (2006.01)

(52) U.S. Cl.
CPC .......... *F16B 11/006* (2013.01); *F16B 11/008* (2013.01); *B29L 2031/265* (2013.01)

(56) References Cited

U.S. PATENT DOCUMENTS

| | | | |
|---|---|---|---|
| 5,203,226 | A | 4/1993 | Hongou et al. |
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,287,042 | B1 * | 9/2001 | Eriksson ................ E04H 12/32 116/173 |
| 6,318,642 | B1 | 11/2001 | Goenka et al. |
| 6,365,057 | B1 | 4/2002 | Whitehurst et al. |
| 6,391,251 | B1 | 5/2002 | Keleher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,165,910 | B2 * | 1/2007 | Sundheimer .......... F16B 11/008 403/292 |
| 7,228,787 | B2 * | 6/2007 | Zins ........................ E21D 15/24 277/435 |
| 7,341,285 | B2 * | 3/2008 | McPherson ........... B29C 66/342 285/286.1 |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,837,233 | B2 * | 11/2010 | Johnston ................ F16L 57/06 285/302 |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,555,608 | B2 * | 1/2017 | Woleader ................ B29C 66/55 |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |

(56) References Cited

U.S. PATENT DOCUMENTS

| | | |
|---|---|---|
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,975,179 B2 * | 5/2018 | Czinger .................. G06F 30/17 |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Feffatsidis et al. |
| 10,286,452 B2 | 5/2019 | Buller et al. |

(56) References Cited

U.S. PATENT DOCUMENTS

| | | | |
|---|---|---|---|
| 10,286,603 B2 | 5/2019 | Buller et al. | |
| 10,286,961 B2 | 5/2019 | Hillebrecht et al. | |
| 10,289,263 B2 | 5/2019 | Troy et al. | |
| 10,289,875 B2 | 5/2019 | Singh et al. | |
| 10,291,193 B2 | 5/2019 | Dandu et al. | |
| 10,294,552 B2 | 5/2019 | Liu et al. | |
| 10,294,982 B2 | 5/2019 | Gabrys et al. | |
| 10,295,989 B1 | 5/2019 | Nevins | |
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,385,908 B2 * | 8/2019 | Greegor | F16B 11/006 |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 10,697,488 B2 * | 6/2020 | Ummenhofer | B29C 65/4805 |
| 2006/0108783 A1 | 5/2006 | Ni et al. | |
| 2007/0261787 A1 | 11/2007 | Malis | |
| 2007/0270029 A1 | 11/2007 | Schroeder et al. | |
| 2009/0014121 A1 | 1/2009 | McPherson | |
| 2011/0158741 A1 * | 6/2011 | Knaebel | B62D 29/008 403/265 |
| 2014/0277669 A1 | 9/2014 | Nardi et al. | |
| 2014/0376995 A1 * | 12/2014 | Faass | F16B 11/008 403/267 |
| 2017/0001368 A1 | 1/2017 | Czinger et al. | |
| 2017/0050677 A1 * | 2/2017 | Czinger | B62D 27/023 |
| 2017/0097031 A1 | 4/2017 | Woleader et al. | |
| 2017/0113344 A1 | 4/2017 | Schönberg | |
| 2017/0341309 A1 | 11/2017 | Piepenbrock et al. | |
| 2019/0292769 A1 * | 9/2019 | Yahav | E04G 1/10 |
| 2020/0072270 A1 * | 3/2020 | Ghanam | F16B 25/0068 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Mar. 27, 2019, regarding PCT/US2018/064206.

* cited by examiner

APPARATUS AND METHODS FOR CONNECTING NODES TO TUBES IN TRANSPORT STRUCTURES

BACKGROUND

Field

The present disclosure relates generally to techniques for joining nodes to tubes, and more specifically to joining nodes to tubes using additively manufactured parts.

Background

Recently three-dimensional (3D) printing, also referred to as additive manufacturing, has presented new opportunities to efficiently build parts for automobiles and other transport structures such as airplanes, boats, motorcycles, and the like. Applying additive manufacturing processes to industries that produce these products has proven to produce a structurally more efficient transport structure. An automobile produced using 3D printed components can be made stronger, lighter, and consequently, more fuel efficient. Furthermore, 3D printing of parts for automobiles can be more eco-friendly than conventional manufacturing techniques, as it does not significantly contribute to the burning of fossil fuels during the manufacturing process.

Automobiles and transport vehicles are constructed with panels, extrusions, nodes, and tubes. Conventional techniques for joining parts, such as welding, may not be a viable alternative to realize robust, multi-material, lightweight connections between components in a transport structure. Using additive manufacturing to fabricate nodes provides the opportunity to obtain successful connections between nodes and tubes, panels, extrusions, other standardized components, and other additively manufactured nodes. Accordingly, there is a need to discover and develop new ways to join tubes to nodes using additively manufactured parts and techniques.

SUMMARY

Several aspects of techniques for joining nodes to tubes using node to tube joints will be described more fully hereinafter with reference to three-dimensional (3D) printing techniques.

In one aspect an apparatus comprises a node. The node comprises a node wall, a first sealing interface, and a first adhesive path. The node wall has a perimeter. The first sealing interface is around the perimeter. The first adhesive path is around the perimeter and bounded on a first side by the first sealing interface.

The apparatus can further comprise a second sealing interface; and the first adhesive path can be bounded on a second side by the second sealing interface. The first sealing interface, the second sealing interface, and the node wall can form a first annular region.

The apparatus can further comprise a port. The port can be an adhesive port directly connected to the first annular region.

The port can be an outlet port directly connected to the first annular region.

The port can be recessed. The port can be protruding. The port can be a hole.

The apparatus can further comprise a tube. The first sealing interface, the second sealing interface, the node wall, and a wall of the tube can form a sealant chamber.

The first sealing interface can comprise a mechanical seal. The mechanical seal can comprise at least one of an O-ring or a gasket.

The node can further comprise a plurality of annular regions. The plurality of annular regions can comprise the first annular region. A width for at least one of the plurality of annular regions can be based on an anticipated load of a connection between the node and a tube coupled to the node.

In another aspect a method comprises manufacturing a node. The node comprises a node wall, a first sealing interface, and a first adhesive path. The node wall has a perimeter. The first sealing interface is around the perimeter. The first adhesive path is around the perimeter and bounded on a first side by the first sealing interface.

The method can further comprise manufacturing the node to comprise a second sealing interface. The first adhesive path can be bound on a second side by the second sealing interface. The first sealing interface, the second sealing interface, and the node wall can form a first annular region.

The method can further comprise manufacturing the node to include an adhesive port. The adhesive port can be directly connected to the first annular region.

The method can further comprise manufacturing the node to include an outlet port. The outlet port can be directly connected to the first annular region.

The method can further comprise coupling a tube to the node. The first sealing interface, the second sealing interface, the node wall, and a wall of the tube can form a sealant chamber.

The method can further comprise drawing a vacuum to evacuate the sealant chamber. The method can further comprise injecting an adhesive to create an adhesive fill. The method can further comprise removing the vacuum following the adhesive fill. The method can further comprise removing the adhesive following the adhesive fill.

The node can further comprise a plurality of annular regions. The plurality of annular regions can comprise the first annular region; and the method can further comprise selecting a width for at least one of the plurality of annular regions based on an anticipated load of a connection between the node and a tube coupled to the node.

The first sealing interface can comprise a mechanical seal. The mechanical seal can comprise at least one of an O-ring or a gasket. Manufacturing the node can comprise additively manufacturing the node.

It will be understood that other aspects of joining nodes to tubes using node to tube joints will become readily apparent to those skilled in the art from the following detailed description, wherein it is shown and described only several embodiments by way of illustration. As will be appreciated by those skilled in the art, the joining of nodes to tubes using additively manufactured parts can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for joining nodes to tubes with node to tube joints will now be presented in the detailed description by way of example, and not by way of limitation, in the accompanying drawings, wherein.

DETAILED DESCRIPTION

The detailed description set forth below in connection with the drawings is intended to provide a description of exemplary embodiments of joining additively manufactured nodes and tubes, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for connecting additively manufactured parts and/or commercial off the shelf (COTS) components, also referred to as standardized components. Multi-material connections can be realized using additively manufactured components to provide robust isolation and by preventing physical contact between dissimilar materials, thereby preventing galvanic corrosion. Additively manufactured parts are printed three-dimensional (3D) parts that are printed by adding layer upon layer of a material based on a preprogramed design. The parts described in the foregoing may be parts used to assemble a transport structure such as an automobile. However, those skilled in the art will appreciate that the manufactured parts may be used to assemble other complex mechanical products such as vehicles, trucks, trains, motorcycles, boats, aircraft, and the like without departing from the scope of the invention.

Additive manufacturing provides the ability to create complex structures within a part. For example, a node is a structural member that may include one or more interfaces used to connect to other spanning components such as tubes, extrusions, panels, and the like. Using additive manufacturing, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain additive manufacturing embodiments, additive manufacturing provides significant flexibility in enabling the use of alternative or additional connection techniques.

As described above, these are non-traditional approaches to connecting additively manufactured components and it can be advantageous to develop new ways to join components together during the manufacturing process. Joining nodes to tubes may incorporate one or more factors such as materials, structure, design, and/or connecting features. Additionally, a variety of tubes, including metal and alloy tubes, may be used in the teachings herein. Tubes may comprise a variety of different materials. For instance, as one of ordinary skill in the art can appreciate, tubes may comprise materials such as fiber reinforced composite, glass fiber reinforced polymer composite, thermoplastic, thermoset materials, and the like. In addition, tubes may be manufactured via a variety of manufacturing processes.

Apparatus and methods for joining nodes to tubes with node to tube joints are presented herein. Joining techniques allow the connection of additively manufactured nodes to tubes. In an embodiment, at least one node may be joined to a tube and may be a part of a vehicle chassis. The node to tube joint connection incorporates adhesive bonding between the node to tube to realize the connection. Sealants may be used to provide sealed regions to contain the flow of adhesive within defined regions during adhesive injection and to keep the regions clear from foreign substances. Additionally, sealants may act as isolators and reduce galvanic corrosion by preventing physical contact between the dissimilar materials being connected.

The node to tube connections described herein may be used as part of a vehicle chassis. An adhesive can be used between the node and tube to realize a node to tube connection. Sealants can be used to provide sealed regions for adhesive injection. Additionally, sealants can act as isolators to prevent potential galvanic corrosion, as noted above. The sealants can ensure that the adhesive regions are hermetically sealed such that contamination by foreign and/or environmental agents is prevented. Also, by using additively manufactured nodes, tooling costs and lead times can be reduced.

Figure 1:
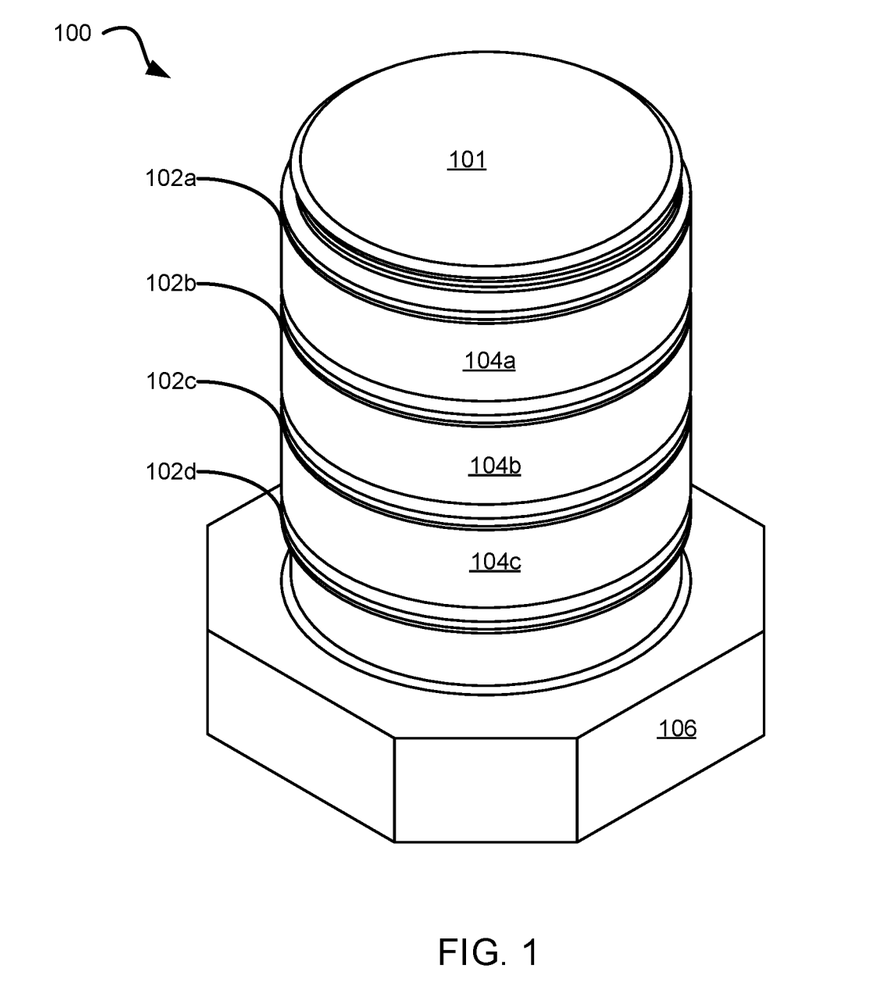
FIG. 1 illustrates a node attachment with adhesive paths according to an embodiment.

FIG. 1 illustrates a node attachment 100 according to an embodiment. The node attachment 100 includes a node 101 with adhesive paths 104a-c attached to a base 106 and sealant interfaces 102a-d. In the disclosure herein, sealant interfaces 102a-d may also be referred to as sealant grooves, sealing grooves, and/or sealing interfaces. As shown, the sealant interfaces 102a-d separate the adhesive paths 104a-c. The sealant interfaces 102a-d can house O-rings or, in other configurations the grooves 102a-d may include other types of sealants. The node 101 can be additively manufactured to include the sealant interfaces 102a-d and the base 106. As will be shown in FIG. 2, the node can also incorporate adhesive injection port(s) and/or other port(s). An outlet port can be used to attach a vacuum for drawing the adhesive and/or to function as a flow outlet port. In certain embodiments, the node 101 can include ports, which can be formed as recesses and/or holes instead of protrusions.

Although FIG. 1 illustrates the node attachment 100 as using a node 101 with three adhesive paths 104a-c attached to a base 106 and separated by sealant interfaces 102a-102d, other node configurations are possible. For instance, in some embodiments a node can have greater or fewer adhesive paths with greater or fewer sealant interfaces. In other embodiments, nodes may incorporate additional, potentially sophisticated, functions or structural features, whether at a surface of the node or integrated within the node. Also, in other embodiments the base 106 can have different shapes other than that shown. For instance, instead of having a hexagonal shape, the base 106 can have a circular or rectangular shape. Similarly, the remainder of the node can have any number of different possible shapes and configurations.

Also, although FIG. 1 illustrates a node attachment 100 having a round profile applicable to attaching a tube with a circular cross section, other embodiments are possible. For instance, instead of having a round profile, the node attachment 100 could have a rectangular, hexagonal, and/or square profile. In this way tubes with circular, rectangular, hexagonal, and/or square cross sections could be connected using the methods presented herein.

Figure 2:
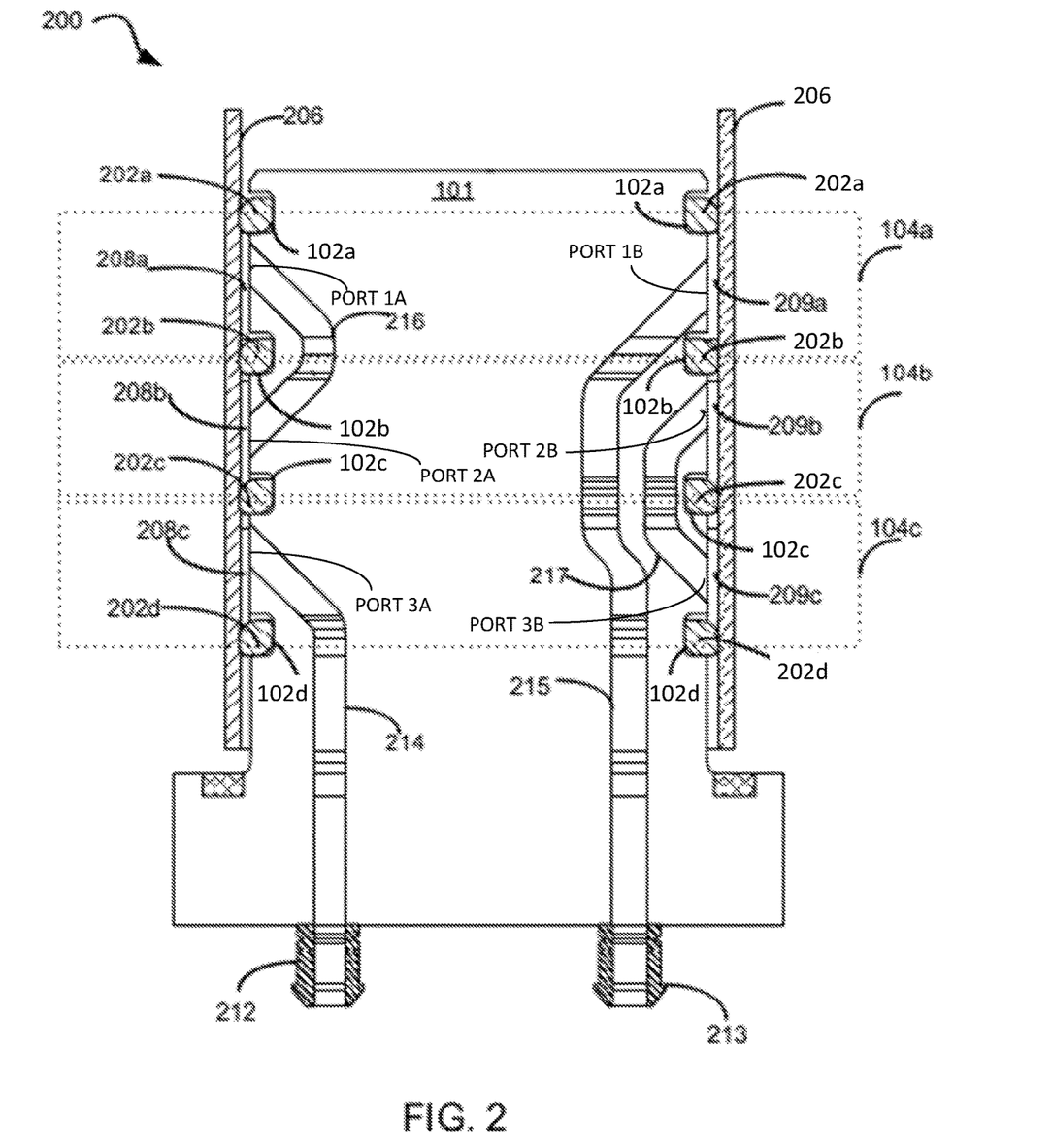
FIG. 2 illustrates a cross-sectional view of a node to tube joint according to an embodiment.

FIG. 2 illustrates a cross-sectional view of a node to tube joint 200 according to an embodiment. The node to tube joint 200 includes the node 101 surrounded by a tube 206. As in FIG. 1, the node 101 is partitioned into three adhesive paths 104a-c. Adhesive path 104a is partitioned between sealant interfaces 102a and 102b. Adhesive path 104b is partitioned between sealant interfaces 102b and 102c; and adhesive path 104c is partitioned between sealant interfaces 102c and 102d. O-rings 202a-202d are placed within sealant interfaces 102a-d to separate and allow the formation of seals within each of the three adhesive paths 104a-c. As shown in FIG. 2, O-ring 202a is placed in sealant interface 102a. O-ring 202b is placed in sealant interface 102b. O-ring 202c is placed in sealant interface 102c; and O-ring 202d is placed in sealant interface 102d. Due to the cross-sectional view of FIG. 2, the O-rings 202a-d, while four circular rings in reality, each appear as two distinct segments on respective sides of the tube 206, and like the tube 206 itself, the O-rings 202a-d are essentially protruding out of the plane of the drawing, above which would they curve in and meet to form the circular structure. Additionally, the sealant interfaces 102a-d can be printed as grooves which, in turn, can advantageously be used for holding the O-rings 202a-202d.

The node 101 also includes adhesive channels 214, 215, 216, and 217 which are positioned to allow a closed adhesive flow path between an external port 212 and an external port 213. The adhesive channels can also enable sequential flow of the adhesive into specific adhesive paths between the outer surface of the node and the inner surface of the tube, i.e. 104a, 104b, 104c.

As shown in FIG. 2, the adhesive channels 214, 215, 216, and 217 may connect into the sealant chambers 208a-c and 209a-c via ports 1A, 1B, 2A, 2B, 3A, and 3B. For instance, adhesive channel 215 connects into sealant chamber 209a via the port 1A; also adhesive channel 216 connects into sealant chamber 208a via the port 1B and into the port 208b via the port 2A. The ports 1A, 1B, 2A, 2B, 3A, and 3B can be holes, and the holes can be tapped, pressed, and/or threaded. Using tapped, pressed, and/or threaded holes as ports can advantageously reduce weight, although other implementations may be equally suitable.

Additionally, in some embodiments protruding ports can be used and the ports can be fabricated as breakaway ports. Breakaway ports allow for easy port removal after completion of a bonding process, which would advantageously result in mass savings. The adhesive channel may be a part of the node and can be additively manufactured. In other embodiments adhesive, outlet, and/or vacuum ports may be located on a base, such as base 106, and the location may be adjusted, for ease of port accessibility during assembly and adhesive injection.

As described herein, ports 1A and 1B are ports for channels in adhesive path 104a, ports 2A and 2B are ports for channels in adhesive path 104b, and ports 3A and 3B are ports for channels in adhesive path 104c. These ports may be holes. In the embodiment of FIG. 2, port 1A can be the end of the adhesive channel 215. Adhesive can exit through port 1A, and the vacuum can draw the adhesive into the adhesive path 104a. Once the adhesive has filled the adhesive path 104a completely, it can exit the region through port 1B. The adhesive can then be drawn into the adhesive path 104b via port 2A. Similar to the previous step in the sequence, it can exit the adhesive path 104b through port 2B. The sequence proceeds to fill the adhesive path 104b, wherein adhesive can enter the adhesive path 104c through port 3A. Once a complete fill is realized, the adhesive can exit the adhesive path 104c through Port 3B, and can proceed to the external port 212 (e.g. the outlet port).

In generating a vacuum, the vacuum is drawn first to evacuate the chambers (eg. chambers 208a-c, 209a-c). Once the chambers are evacuated, then a vacuum connection can be maintained, and the adhesive injection may commence. The vacuum connection can be retained until a complete fill of the adhesive is realized; once the adhesive fill is complete, then both the vacuum and adhesive connections can be disconnected.

Adhesive channel 214 connects between the external port 212 and a sealant chamber 208c between O-ring 202c and O-ring 202d. In this way the adhesive channel 214 provides an adhesive flow path between the sealant chamber 208c and the external port 212. The (closed) adhesive flow path continues from sealant chamber 208c to a sealant chamber 209c via the surface of node 101 in adhesive path 104c.

Adhesive channel 217 connects between the sealant chamber 209c and a sealant chamber 209b. As shown, sealant chamber 209c is between O-rings 202c and 202d; and sealant chamber 209b is between O-rings 202b and 202c. The adhesive channel 217 continues the adhesive flow path between sealant chamber 209c and sealant chamber 209b. The adhesive flow path continues from sealant chamber 209b to a sealant chamber 208b via the surface of node 101 in adhesive path 104b.

Adhesive channel 216 connects between the sealant chamber 208b and a sealant chamber 208a. As shown, sealant chamber 208b is between O-rings 202c and 202b; and sealant chamber 208a is between O-rings 202a and 202b. The adhesive channel 216 continues the adhesive flow path between sealant chamber 208b and sealant chamber 208a. The adhesive flow path continues from sealant chamber 208a to a sealant chamber 209a via the surface of node 101 in adhesive path 104a. Adhesive channel 215 connects between the external port 213 and the sealant chamber 209a between O-ring 202a and O-ring 202b. In this way the adhesive channel 215 continues the adhesive flow path between the sealant chamber 209a and the external port 213.

FIGS. 3A-3G illustrate cross-sectional views of the node to tube joint showing an adhesive fill region according to a sequence of drawing an adhesive. The adhesive can be drawn by using the closed path formed with the adhesive channels 214, 215, 216, and 217. In an embodiment, adhesive can be applied through port 213 and a vacuum can be drawn at port 212 to cause adhesive to follow the sequence discussed below.

Figure 3A:
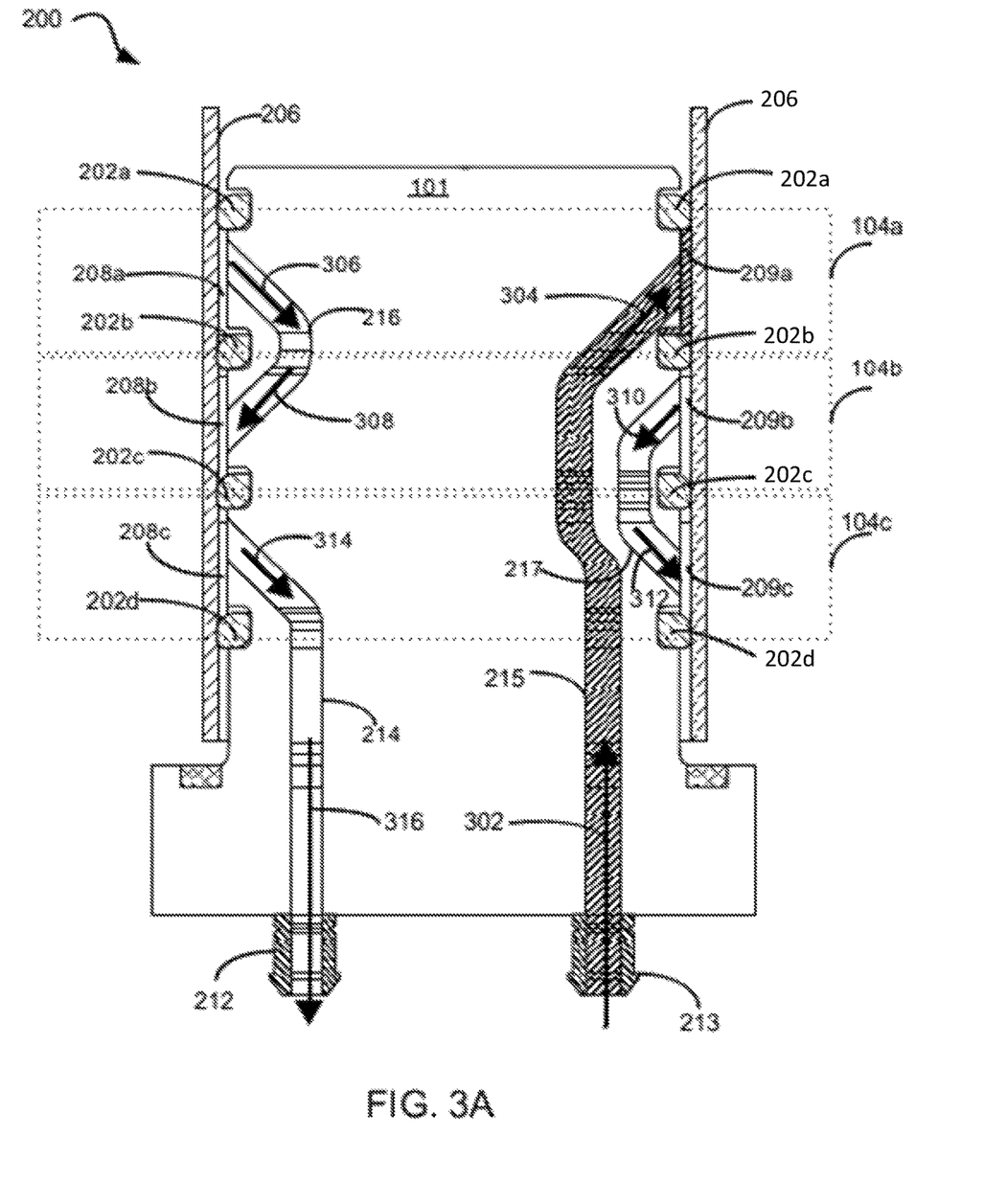
FIG. 3A illustrates a cross-sectional view of the node to tube joint showing an adhesive fill region according to a first part of a sequence.

FIG. 3A illustrates a cross-sectional view of the node to tube joint 200 showing an adhesive fill region according to a first part of the sequence. Adhesive is injected via port 213 along adhesive flow vectors 302 and 304 through adhesive channel 215 into the sealant chamber 209a. As shown in FIG. 3A, during the first part of the sequence the adhesive flow fills the sealant chamber 209a.

Figure 3B:
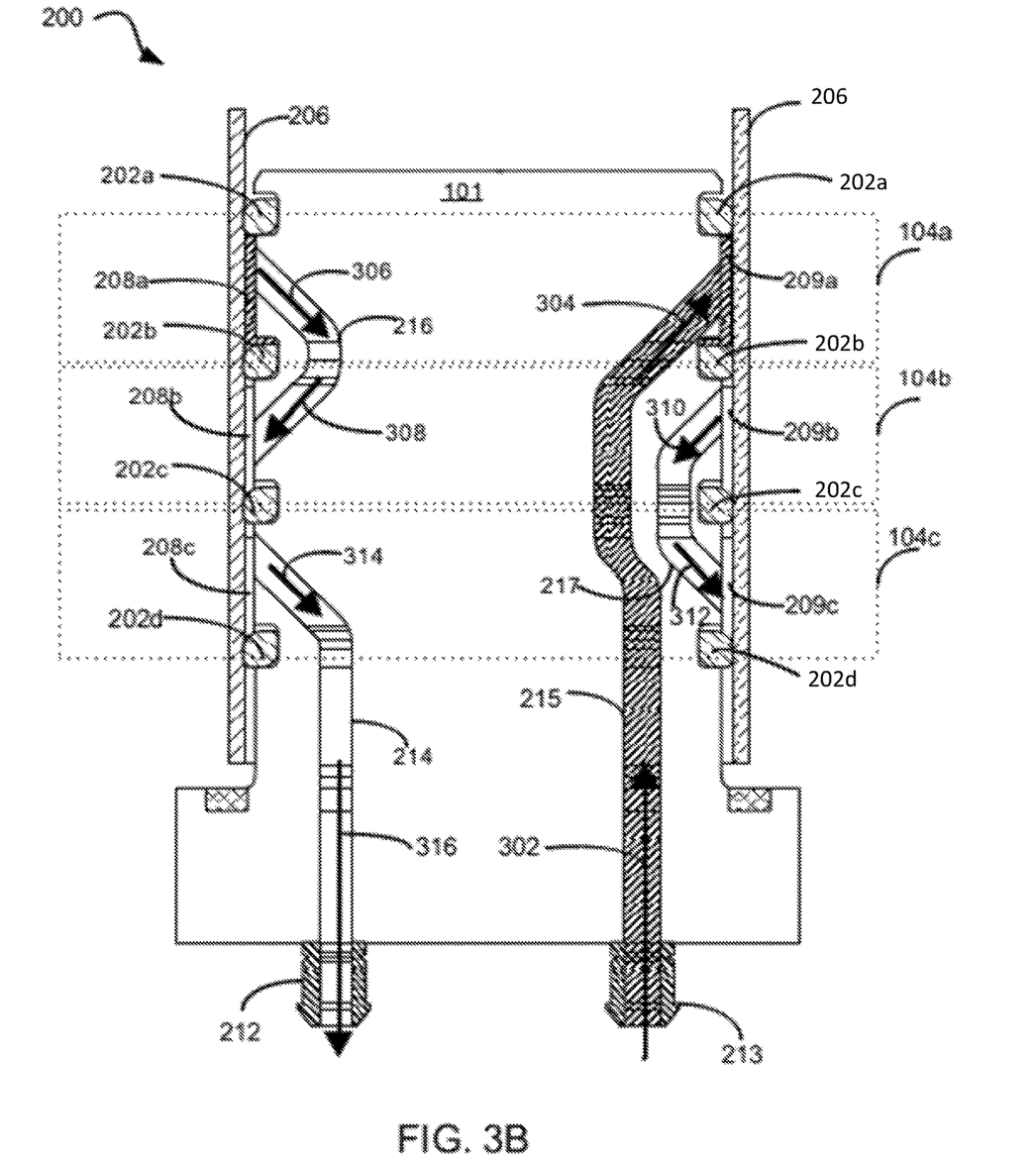
FIG. 3B illustrates a cross-sectional view of the node to tube joint showing an adhesive fill region according to a second part of a sequence.

FIG. 3B illustrates a cross-sectional view of the node to tube joint 200 showing an adhesive fill region according to a second part of the sequence. Adhesive continues flowing from the sealant chamber 209a to the sealant chamber 208a via the surface of node 101 in adhesive path 104a. As shown in FIG. 3B, during the second part of the sequence the adhesive flow fills the sealant chamber 208a.

Figure 3C:
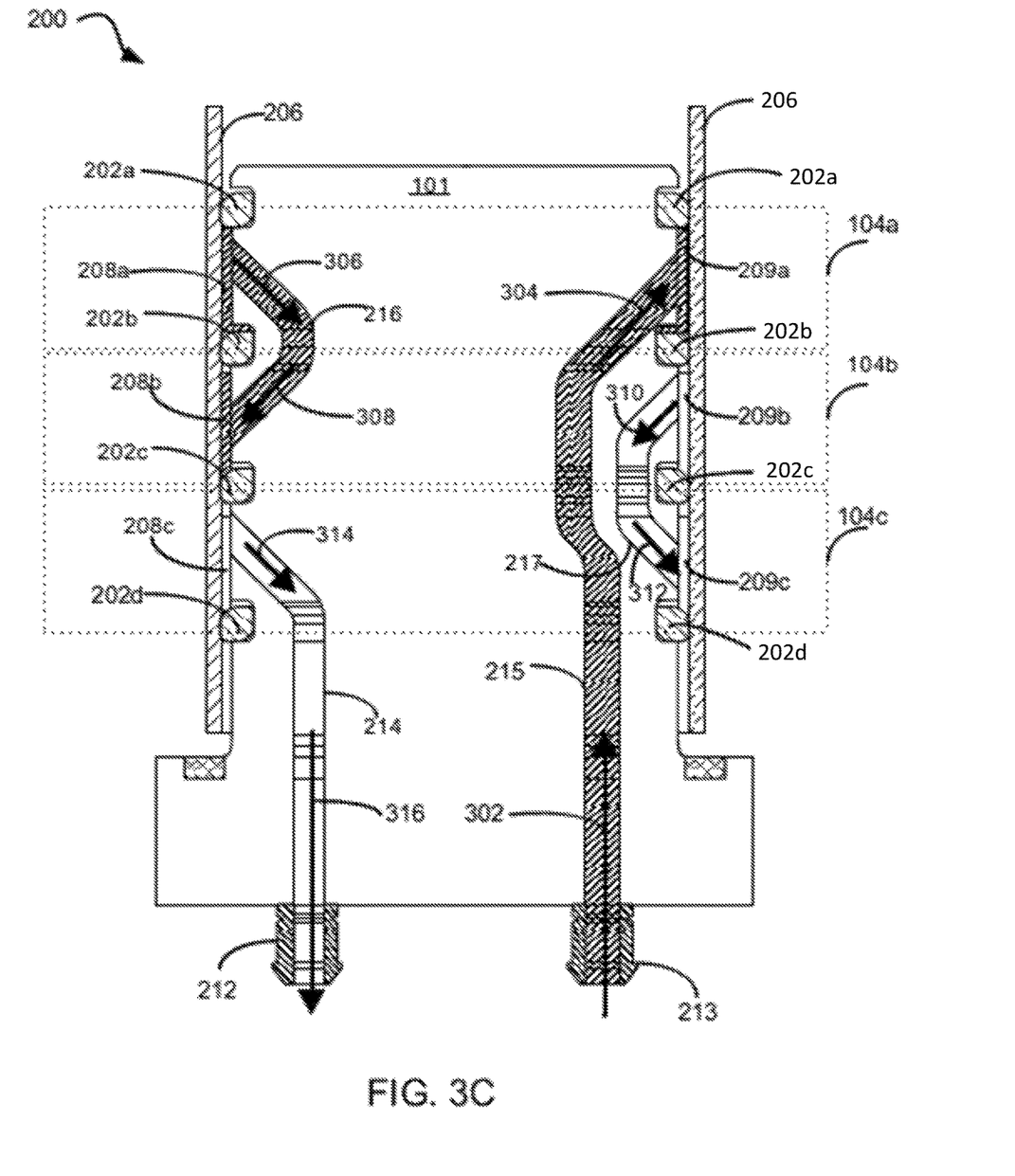
FIG. 3C illustrates a cross-sectional view of the node to tube joint showing an adhesive fill region according to a third part of a sequence.

FIG. 3C illustrates a cross-sectional view of the node to tube joint 200 showing an adhesive fill region according to a third part of the sequence. Adhesive continues flowing along adhesive flow vectors 306 and 308 through adhesive channel 216 from the sealant chamber 208a to the sealant chamber 208b. As shown in FIG. 3C, during the third part of the sequence the adhesive flow fills the sealant chamber 208b.

Figure 3D:
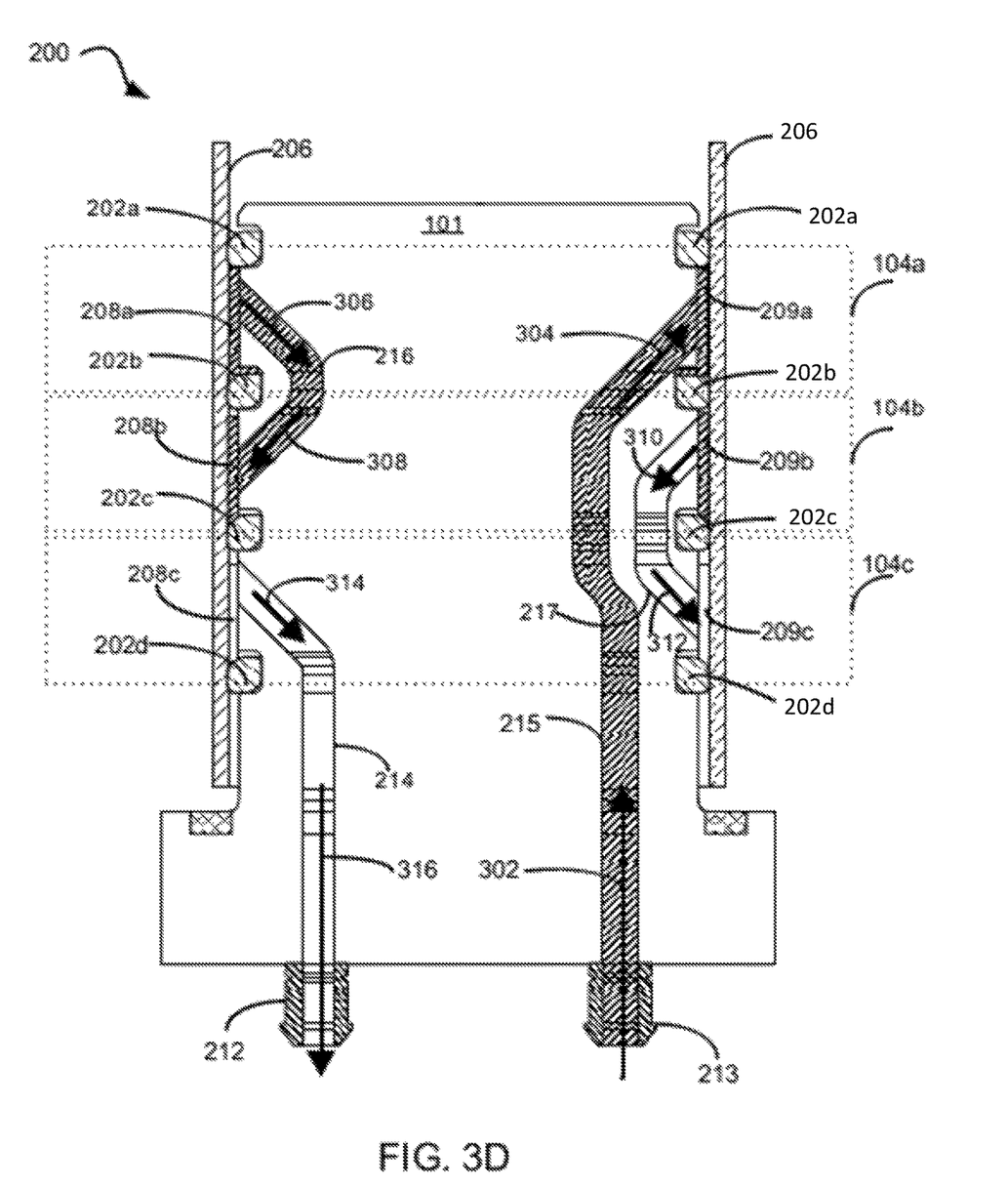
FIG. 3D illustrates a cross-sectional view of the node to tube joint showing an adhesive fill region according to a fourth part of a sequence.

FIG. 3D illustrates a cross-sectional view of the node to tube joint 200 showing an adhesive fill region according to a fourth part of the sequence. Adhesive continues flowing from the sealant chamber 208b to the sealant chamber 209b via the surface of node 101 in adhesive path 104b. As shown in FIG. 3D, during the fourth part of the sequence the adhesive flow fills the sealant chamber 209b.

Figure 3E:
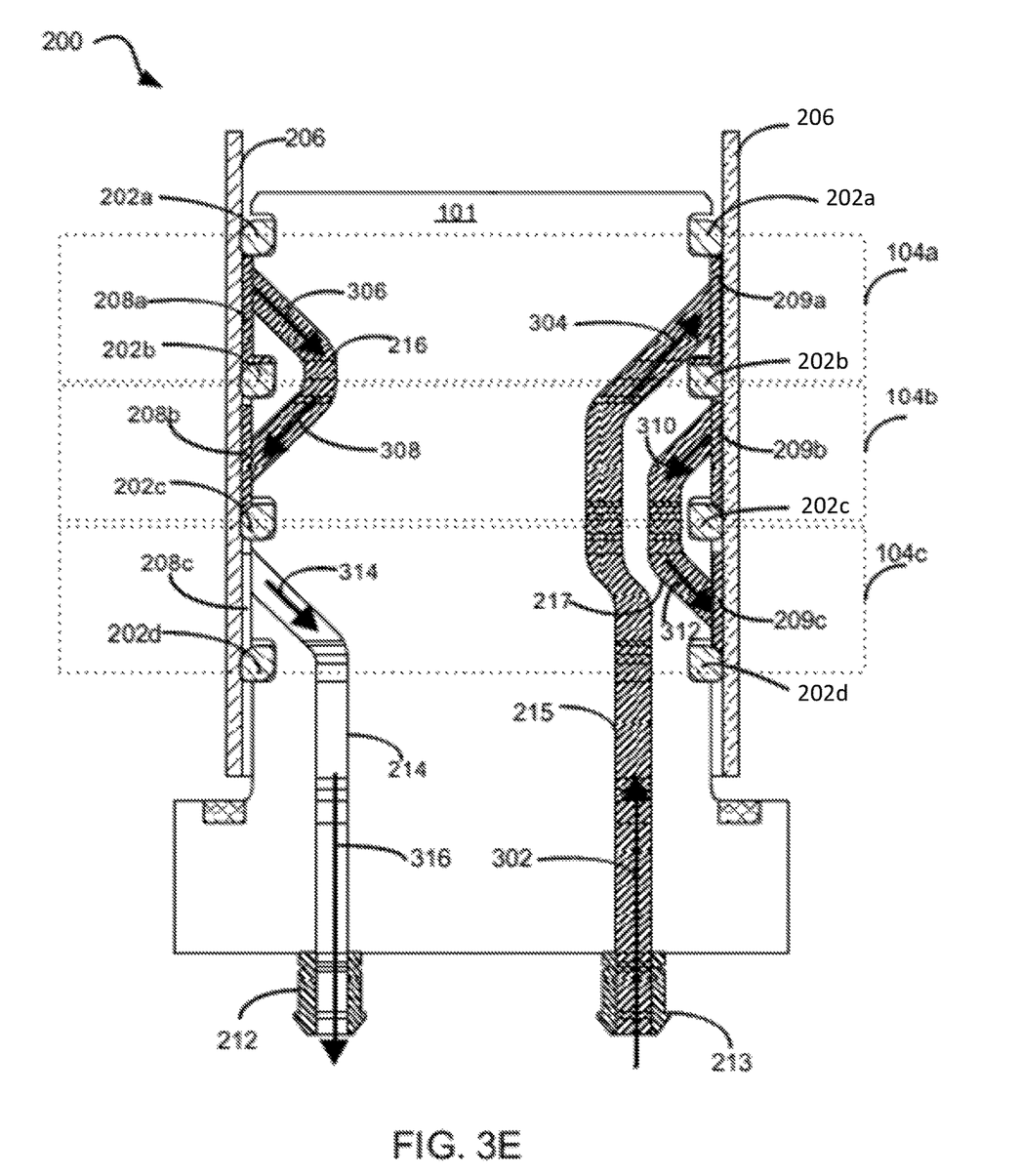
FIG. 3E illustrates a cross-sectional view of the node to tube joint showing an adhesive fill region according to a fifth part of a sequence.

FIG. 3E illustrates a cross-sectional view of the node to tube joint 200 showing an adhesive fill region according to a fifth part of the sequence. Adhesive continues flowing along adhesive flow vectors 310 and 312 through adhesive channel 217 from the sealant chamber 209b to the sealant chamber 209c. As shown in FIG. 3E, during the fifth part of the sequence the adhesive flow fills the sealant chamber 209c.

Figure 3F:
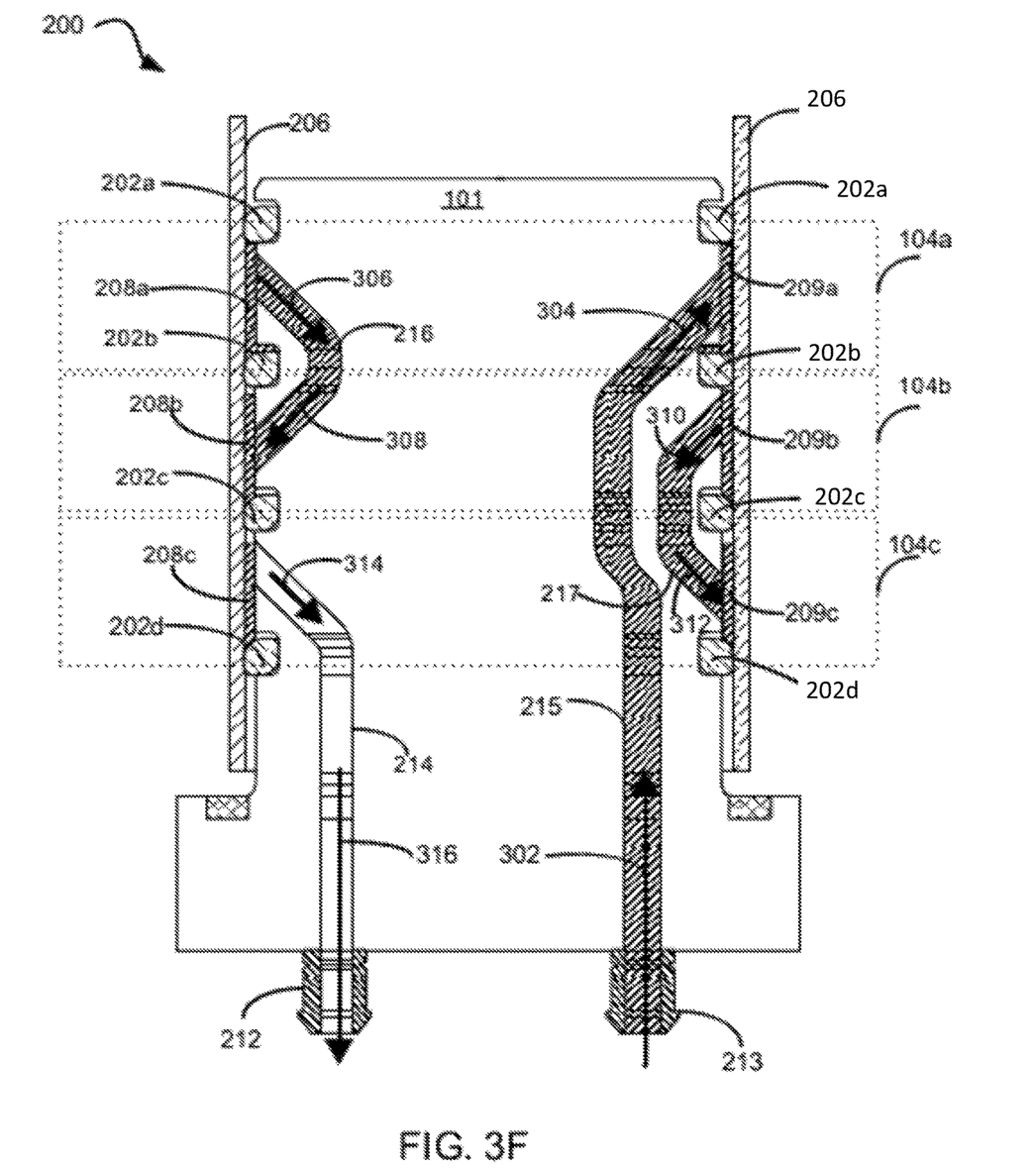
FIG. 3F illustrates a cross-sectional view of the node to tube joint showing an adhesive fill region according to a sixth part of a sequence.

FIG. 3F illustrates a cross-sectional view of the node to tube joint 200 showing an adhesive fill region according to a sixth part of the sequence. Adhesive continues flowing from the sealant chamber 209c to the sealant chamber 208c via the surface of node 101 in adhesive path 104c. The adhesive channel 316 pulls adhesive from the sealant chamber 209c to the sealant chamber 208c as indicated by the adhesive flow vectors 314 and 316. As shown in FIG. 3F, during the sixth part of the sequence the adhesive flow fills the sealant chamber 208c.

Figure 3G:
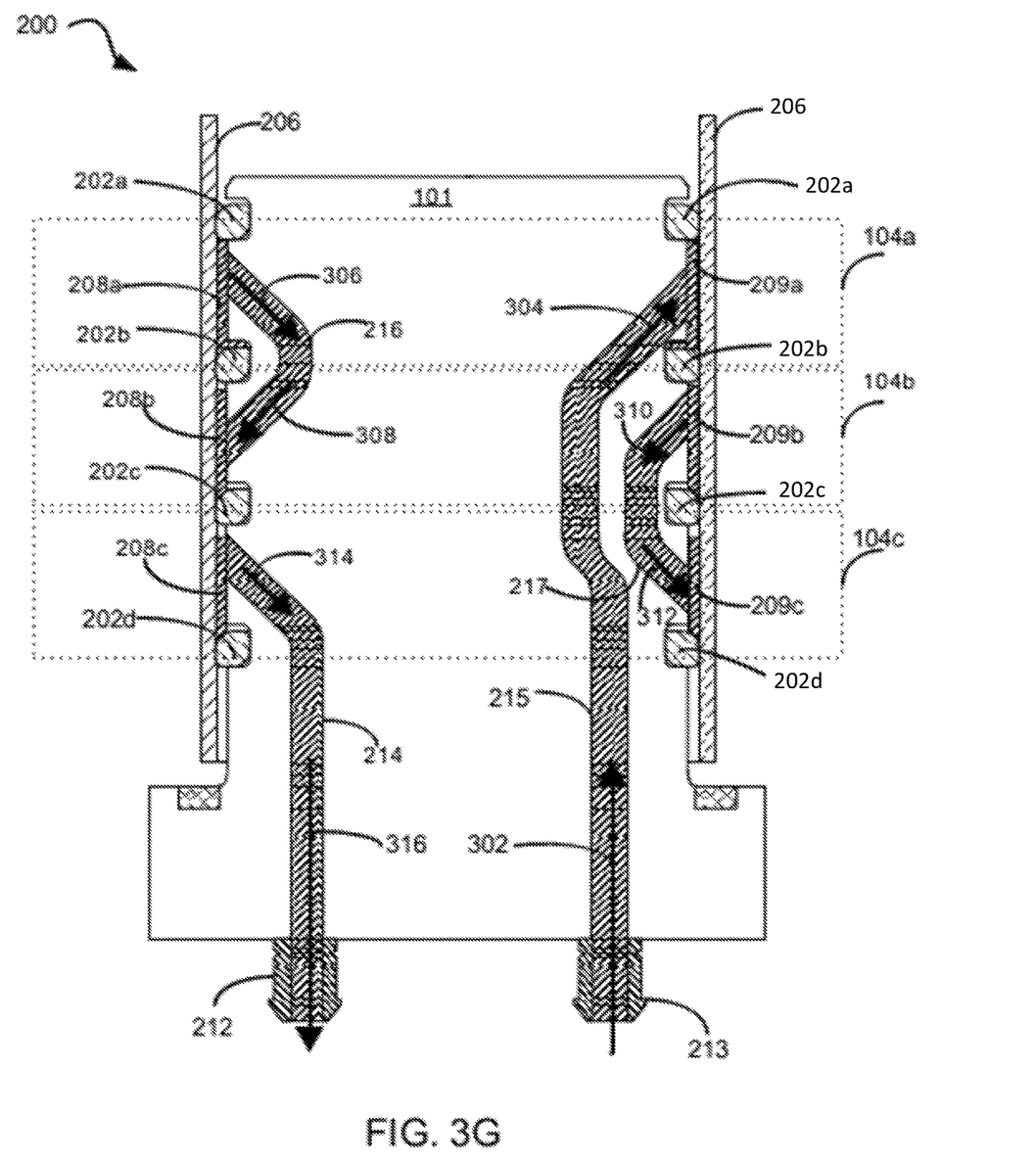
FIG. 3G illustrates a cross-sectional view of the node to tube joint showing an adhesive fill region according to a seventh part of a sequence.

FIG. 3G illustrates a cross-sectional view of the node to tube joint 200 showing an adhesive fill region according to a seventh part of a sequence. Once adhesive has filled the regions between ports 212 and 213 completely as shown in FIG. 3G, the node to tube joint 200 can undergo curing. As one of ordinary skill in the art can appreciate, the curing cycle can be selected based on the adhesive type.

The node 101 may be designed to have a variety of hollow sections to reduce the weight of the part. In an embodiment, the node may be designed and additively manufactured such that its center is substantially hollow. The geometry of the node 101 may have a variety of structural shapes allowing it to be robust and lightweight.

Figure 4:
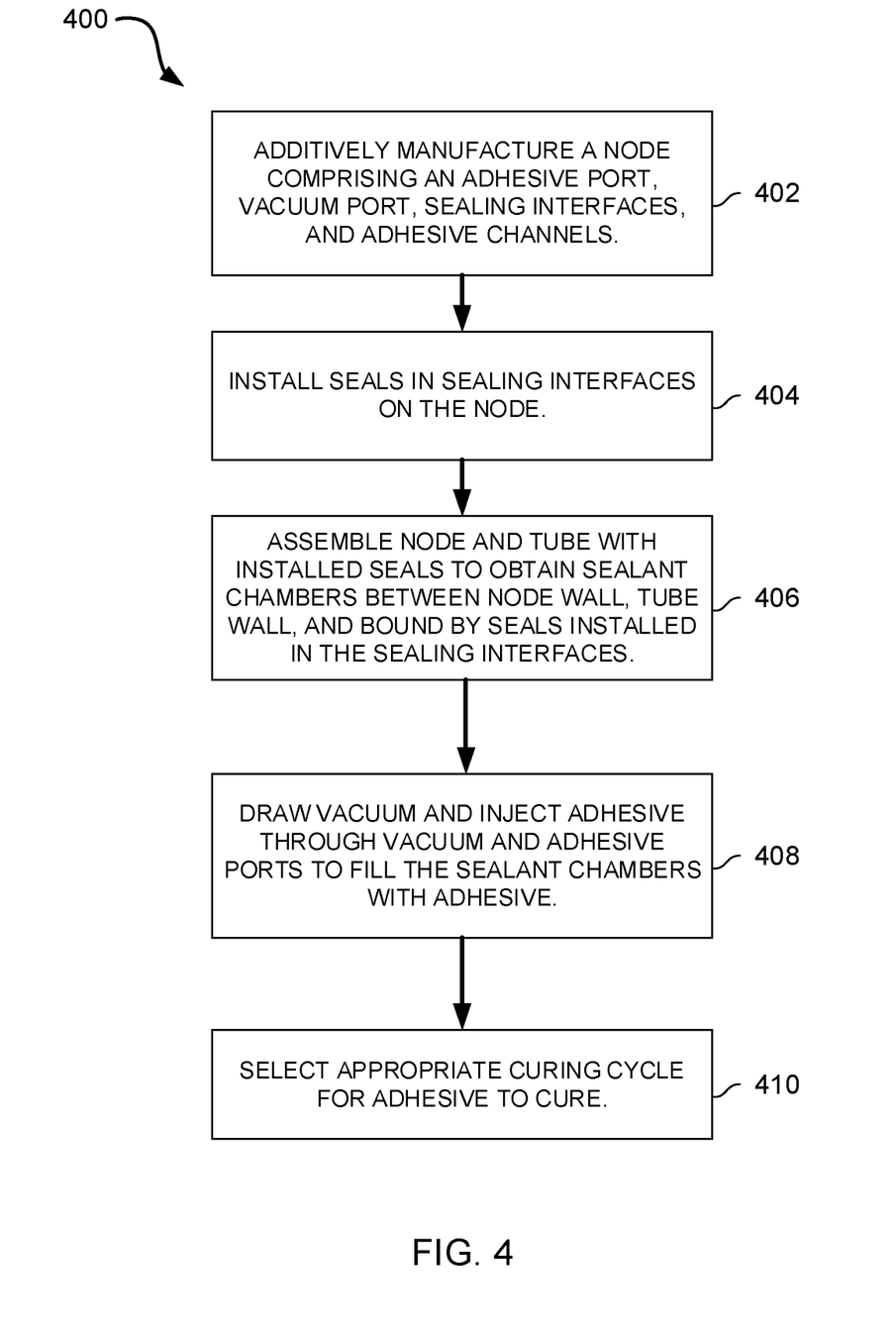
FIG. 4 illustrates a conceptual flow diagram for connecting a tube to a node using node to tube joints according to an embodiment.

FIG. 4 illustrates a conceptual flow diagram for connecting a tube to a node using node to tube joints according to an embodiment. In the first step 402, a node (e.g. node 101) is additively manufactured. The node comprises an adhesive port, vacuum port, sealing interfaces, and adhesive channels. In next step 404, seals, such as O-rings, are installed in sealing interfaces on the node. In the following step 406, a tube is introduced. The tube and node are assembled with the installed seals to obtain sealant chambers. The sealant chambers are between the node wall(s) and tube wall(s) as depicted in FIGS. 3A-3G. The sealant chambers are bound by the seals (e.g. O-rings) installed in the sealing interfaces. Next in step 408 a vacuum is drawn through the vacuum port while the adhesive is injected through the adhesive port to fill the sealant chambers with adhesive. Finally, in step 410 a curing cycle, appropriate to the type of adhesive, is selected to cure the adhesive.

Seals can be applied to the sealing interfaces after the node is additively manufactured, and after all the prerequisite post processing operations are performed. Once the seals are applied at the sealing interfaces, the node can be assembled with the tube. The seals housed in the sealing interfaces can provide the required seals for the sealing chambers. Once this is done, a vacuum can be drawn, and adhesive can be injected. The adhesive can flow into the sealant chambers and also into a plurality of adhesive annular regions.

The above process can also be automated and a complete fill of adhesive may be monitored through a variety of ways: For instance, a vacuum pressure during the adhesive flow process may be monitored and may be indicative of a complete adhesive fill. Alternatively and additionally, a volume of the adhesive being injected may be monitored; it may be determined that the fill is complete once the appropriate amount of adhesive has been injected into the assembly. Also, automated assembly systems may incorporate vision systems to image adhesive flow out of and/or into the vacuum port to determine when the adhesive fill process is complete. In some embodiments not using vacuum connections, positive injection pressure of adhesive injection would be sufficient to evacuate the chambers, and inject adhesive into the chambers. The adhesive would flow out of the outlet port, indicating a complete fill.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing and joining nodes and tubes with node to tube joints. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   a node comprising:
   a node wall having a perimeter, wherein the node wall includes a plurality of openings to a plurality of channels in the node;
   a plurality of sealing interfaces around the perimeter, the sealing interfaces configured to form a plurality of chambers, wherein each chamber is between two of the sealing interfaces, and
   a first adhesive path comprising the plurality of chambers and the plurality of channels, wherein the channels connect the chambers together to form the first adhesive path.

2. The apparatus of claim 1, wherein the plurality of sealing interfaces and the node wall form a first annular region.

3. The apparatus of claim 2, further comprising a port coupled to the first adhesive path.

4. The apparatus of claim 3, wherein the port is an adhesive port directly connected to the first annular region.

5. The apparatus of claim 3, wherein the port is an outlet port directly connected to the first annular region.

6. The apparatus of claim 3, wherein the port is recessed.

7. The apparatus of claim 3, wherein the port protrudes.

8. The apparatus of claim 3, wherein the port is a hole.

9. The apparatus of claim 2, further comprising a tube, wherein the plurality of sealing interfaces, the node wall and a wall of the tube form a sealant chamber.

10. The apparatus of claim 2,
    wherein the node further comprises a plurality of annular regions;
    wherein the plurality of annular regions comprises the first annular region; and
    wherein a width for at least one of the plurality of annular regions is based on an anticipated load of a connection between the node and a tube coupled to the node.

11. The apparatus of claim 1, wherein at least one sealing interface in the plurality of sealing interfaces comprises a mechanical seal.

12. The apparatus of claim 11, wherein the mechanical seal comprises at least one of an O-ring or a gasket.

13. A method, comprising:
    manufacturing a node comprising:
    a node wall having a perimeter, wherein the node wall includes a plurality of openings to a plurality of channels in the node;
    a plurality of sealing interfaces around the perimeter, the plurality of sealing interfaces configured to form a plurality of chambers, wherein each chamber is between two of the sealing interfaces, and
    a first adhesive path comprising the plurality of chambers and the plurality of channels, wherein the channels connect the chambers together to form the first adhesive path.

14. The method of claim 13, wherein the plurality of sealing interfaces and the node wall form a first annular region.

15. The method of claim 14, further comprising manufacturing the node comprising an adhesive port coupled to the first adhesive path.

16. The method of claim 15, wherein the adhesive port is directly connected to the first annular region.

17. The method of claim 14, further comprising manufacturing the node comprising an outlet port coupled to the first adhesive path.

18. The method of claim 17, wherein the outlet port is directly connected to the first annular region.

19. The method of claim 14, further comprising coupling a tube to the node, wherein the plurality of sealing interfaces, the node wall, and a wall of the tube form a sealant chamber.

20. The method of claim 19, further comprising:
    drawing a vacuum to evacuate the sealant chamber; and
    injecting an adhesive into the sealant chamber to create an adhesive fill.

21. The method of claim 14,
    wherein the node further comprises a plurality of annular regions;
    wherein the plurality of annular regions comprise the first annular region; and
    wherein the method further comprises selecting a width for at least one of the plurality of annular regions based on an anticipated load of a connection between the node and a tube coupled to the node.

22. The method of claim 13, wherein the first sealing interface comprises a mechanical seal.

23. The method of claim 22, wherein the mechanical seal comprises at least one of an O-ring or a gasket.

24. The method of claim 13, wherein manufacturing the node comprises additively manufacturing the node.

* * * * *